United States Patent
Wood (10) Patent No.: US 7,120,408 B2
(45) Date of Patent: Oct. 10, 2006

(54) DIFFERENTIAL SIGNAL SQUELCH DETECTION CIRCUIT AND METHOD

(75) Inventor: Glenn Wood, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 409 days.

(21) Appl. No.: 10/631,690

(22) Filed: Jul. 31, 2003

(65) Prior Publication Data

US 2005/0026581 A1 Feb. 3, 2005

(51) Int. Cl.
*H04B 1/10* (2006.01)

(52) U.S. Cl. .............. 455/218; 455/230; 455/231; 455/254; 455/220

(58) Field of Classification Search ............. 455/218, 455/219–225, 226.2, 227, 229, 230, 231, 455/254, 267, 334, 337, 338; 327/50–58, 327/62, 65, 72–80; 375/351
See application file for complete search history.

(56) References Cited

U.S. PATENT DOCUMENTS

| | | | | |
|---|---|---|---|---|
| 3,873,926 A | * | 3/1975 | Wright | 455/225 |
| 4,731,868 A | * | 3/1988 | Dreier | 455/161.1 |
| 4,908,530 A | * | 3/1990 | Huang | 326/22 |
| 5,418,821 A | * | 5/1995 | Tran | 375/351 |
| 5,436,934 A | * | 7/1995 | Co | 375/351 |
| 5,550,836 A | * | 8/1996 | Albrecht et al. | 370/461 |
| 5,697,079 A | * | 12/1997 | Spivey | 455/212 |
| 5,717,720 A | * | 2/1998 | Jackson et al. | 375/316 |
| 5,821,790 A | * | 10/1998 | Sweetman | 327/184 |
| 5,828,240 A | * | 10/1998 | Smith | 327/62 |
| 6,356,749 B1 | * | 3/2002 | Rollins et al. | 455/334 |
| 6,771,774 B1 | * | 8/2004 | Phan et al. | 379/413.02 |
| 6,774,700 B1 | * | 8/2004 | Wood | 327/403 |
| 6,781,465 B1 | * | 8/2004 | Berzins et al. | 330/258 |
| 2003/0185308 A1 | * | 10/2003 | Schoenborn | 375/257 |
| 2005/0047499 A1 | * | 3/2005 | Wood | 375/224 |

* cited by examiner

*Primary Examiner*—Duc M. Nguyen (57) ABSTRACT

An electrical circuit detects a "squelch," or "out-of-band," state of a differential signal pair having a positive ("p") signal line and a negative ("n") signal line. In one embodiment of the invention, a first and a second comparator each have positive inputs driven by the positive and negative signal lines, respectively. The negative inputs of the comparators are driven by the outputs of separate digital-to-analog converters (DACs) which are set to a lower squelch threshold voltage. The outputs of the comparators then drive the inputs of a logical AND gate, the output of which indicates the current squelch state of the differential signal pair.

12 Claims, 7 Drawing Sheets

PRIOR ART

DIFFERENTIAL SIGNAL SQUELCH DETECTION CIRCUIT AND METHOD

BACKGROUND OF THE INVENTION

Several modern high-speed serial data busses, normally used for digital communication between physically separated electronic devices, implement the well-known, time-tested "differential pair" signal line configuration to transmit and receive data. The differential pair typically consists of two signal lines, a positive ("p") signal line and a negative ("n") signal line, which normally exhibit opposite voltage polarities during normal data transmission. For example, a data value of '1' is usually indicated on a differential pair with a voltage V+ on the "p" line, and a lower voltage V– on the "n" line. Similarly, to indicate a data value of '0', the "p" line would hold a voltage of V– while the "n" line would exhibit a voltage of V+. Therefore, except during times in which the data value of the differential pair is in transition, the magnitude of the differential voltage between the two signal wires generally remains at about V+ minus V–. Use of a differential pair has long been known to exhibit high common-mode rejection, which allows the data being transferred to be unaffected by noise that is induced onto both signal wires of the differential pair.

In addition to transferring data, the modern serial data busses that utilize differential pairs for data transfer, such as Serial AT Attachment (Serial ATA), also utilize those same signal wires to indicate changes in the overall state of the communication link, such as to invoke data bus power management. To indicate these state changes, the two signal wires of the differential pair normally are driven so that the resulting differential voltage is substantially zero for specific periods of time. Driving the differential pair in this manner is commonly known as "squelch," or "out-of-band" signaling. As a result, electronic devices connected to such a bus are usually required to detect the squelch state of the differential pair, which generally only lasts for a few tens or hundreds of nanoseconds.

At least two different methods have been employed in the past to detect the squelch state. For example, comparators that are used typically to detect the normal differential signals over the differential pair are supplemented with a "loss-of-signal" (LOS) output, which indicates that the differential voltage between the two signal wires has fallen below some predetermined threshold. However, the primary purpose of the LOS output is to detect catastrophic failures of the communication links, such as the signal wires of the differential pair being physically disconnected. Thus, the circuit that drives the LOS output is normally designed to ignore temporary periods in which the differential voltage falls below the threshold. As a result, the LOS output often reacts too slowly to reliably detect the squelch state.

Figure 1:
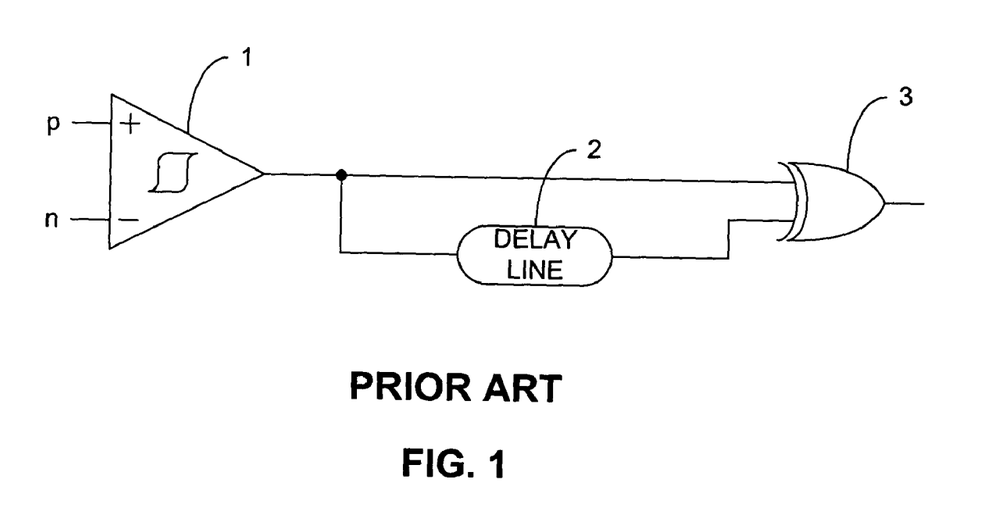
FIG. 1 is a schematic diagram of a squelch detection circuit according to the prior art.

Another previous method, which detects squelch in a more indirect fashion, is shown in FIG. 1. In that case, a comparator 1 with hysteresis is utilized in conjunction with a delay line 2 and a logical exclusive-or (XOR) logic gate 3. The "p" and "n" signal lines are connected to the positive and negative inputs of the comparator 1. While the differential pair transition between +V and –V, the output of the comparator 1 also continues to transition between high and low voltage levels. At each of those transitions, the output of the XOR gate 3 exhibits a logic HIGH level for the amount of the delay introduced by the delay line 2, indirectly indicating normal operation of the differential pair. Conversely, if the pair enters the squelch state for at least the delay period of the delay line 2, the output XOR gate 3 will go LOW, indicating the squelch state. Unfortunately, since the circuit of FIG. 1 is actually detecting the presence or absence of signal transition activity, as opposed to the presence of the squelch state, extended periods of time during which the differential pair resides at their proper +V or –V levels without transition will be incorrectly interpreted as squelch. Additionally, the hysteresis of the comparator 1 is required to prevent false transitions of the comparator 1 when the differential pair is actually in the squelch state. Unfortunately, most high-speed comparators, which would be required in the case of a high-speed serial bus, are designed with minimal hysteresis to facilitate higher signal switching frequencies.

From the foregoing, a need presently exists for a reliable circuit that detects the squelch state of a differential signal pair. Such a circuit would directly detect the squelch state quickly, without relying on a minimum level of transition activity on the differential pair while not in the squelch state.

SUMMARY OF THE INVENTION

Embodiments of the invention, to be discussed in detail below, provide an electrical circuit for detecting a squelch state of a differential signal pair having a positive ("p") signal line and a negative ("n") signal line. In one embodiment of the invention, a first comparator and a second comparator each have negative inputs which are driven by the positive and negative signal lines, respectively. The positive inputs of the converters are each driven by the outputs of separate digital-to-analog converters (DACs). The outputs of the DACs are set to a lower squelch threshold voltage. The outputs of the comparators then drive the inputs of a logical AND gate, the output of which indicates the current squelch state of the differential signal pair.

By directly checking the voltage level of the "p" and "n" signal lines simultaneously and continuously, circuits according to embodiments of this invention detect an emerging squelch state of the differential signal pair directly and quickly.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

Before describing specific embodiments of the invention, a short discussion of the actions of the differential signal lines, "p" and "n", during both the data transfer state and squelch, or out-of-band, state is desirable. As stated earlier, squelch state essentially is the state in which the "p" and "n" signal lines are not being driven to their normal data transmission voltage levels.

Figure 2:
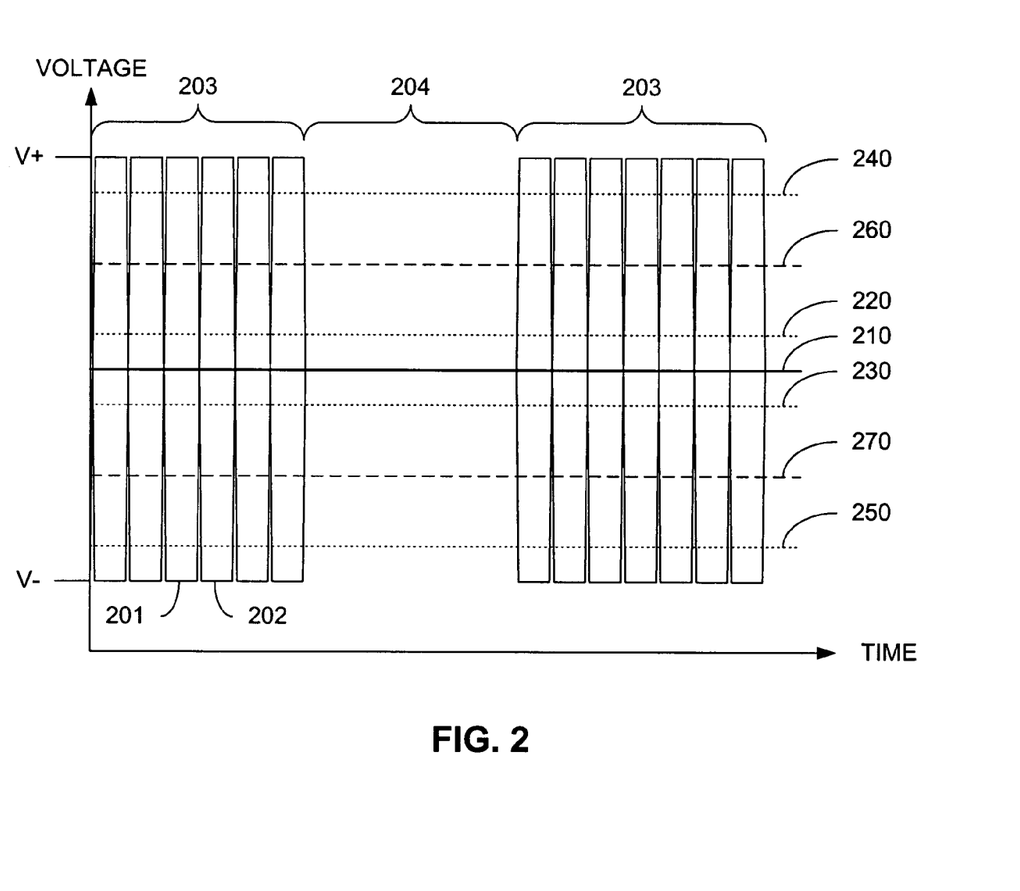
FIG. 2 is a waveform diagram indicating possible squelch threshold voltages for embodiments of the present invention.

FIG. 2 graphically displays in an idealized fashion the action of the differential signal lines when in the data transfer state 203 and while in the squelch state 204. In typical differential signal fashion, the "p" signal waveform 201 and the "n" signal waveform 202, during the data transfer state 203, are essentially mirror images of each other across a midpoint voltage 210, existing substantially halfway between voltage levels V+ and V−. In other words, while the voltage of "p" signal waveform 201 is at V+, the voltage of the "n" signal waveform 202 is at V−, and vice-versa. To ensure that the data represented by the "n" and "p" signal lines is interpreted properly, the signal waveforms 201 and 202 must reside above a minimum high data voltage 240 or below a maximum low data voltage 250 for data to be transmitted reliably. These data thresholds are normally specified to allow for variations in signal driver and receiver designs, noise from other signal sources, and other factors to ensure interoperability across devices transmitting and receiving data along the differential pair.

During the squelch state 204, the "p" and "n" signals generally should maintain their voltage within a second pair of voltage limits so that the squelch state 204 can be distinguished from the data transfer state 203. More specifically, the differential signals should maintain their voltage levels between the maximum squelch voltage 220 and the minimum squelch voltage 230 to ensure that the squelch state 204 will be detected.

Figure 3:
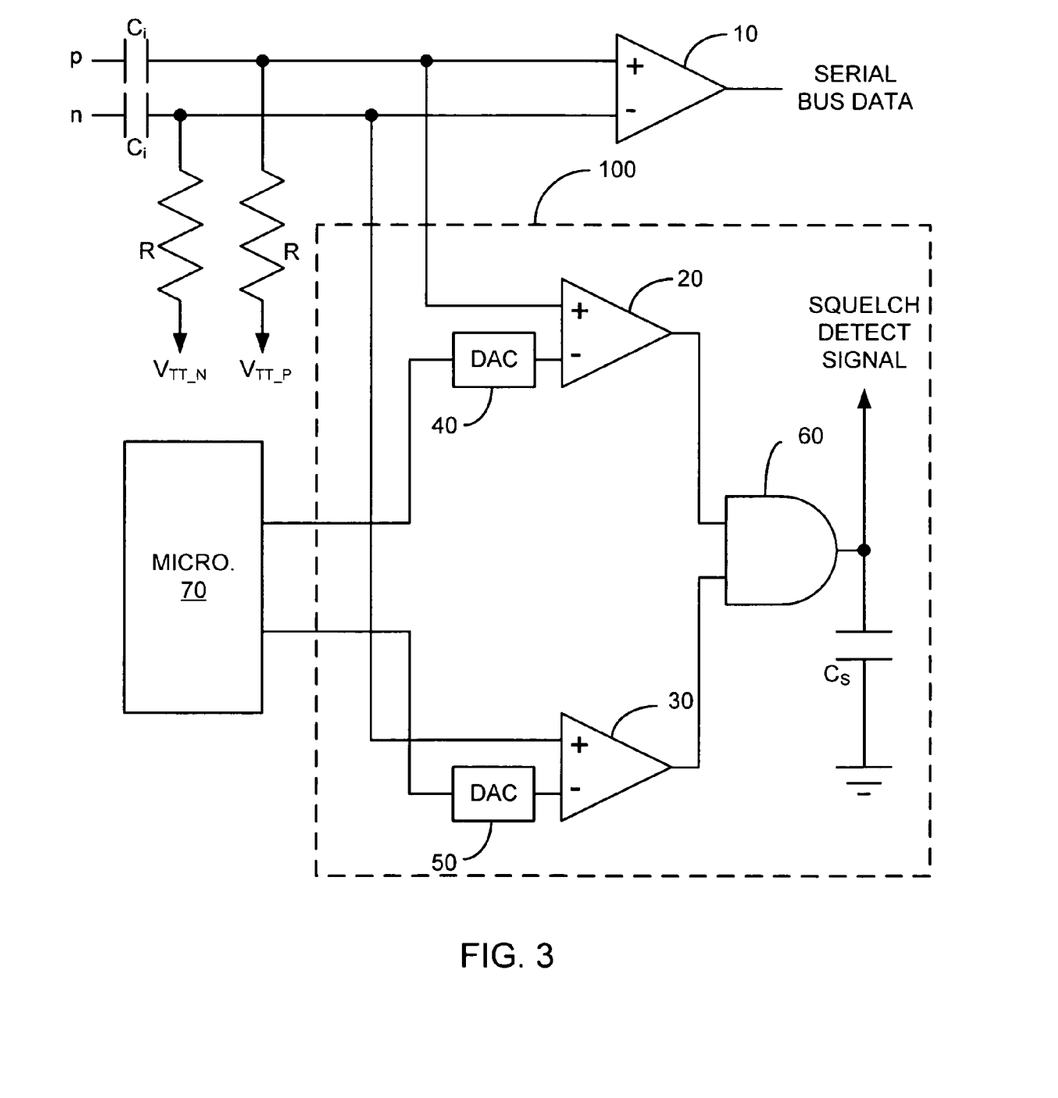
FIG. 3 is a schematic diagram of a first squelch detection circuit according to an embodiment of the invention.

Using this environment as a basis for further discussion, an example of an electrical circuit 100 for detecting the squelch state of a differential signal pair according to an embodiment of the invention is shown in FIG. 3. The two signal lines of the differential pair, "p" and "n", are shown driving a typical receiving circuit, wherein each signal line drives an input of a receiving comparator 10, normally resulting in the receipt of encoded or decoded serial bus data. A direct-current (DC) blocking capacitor C; is employed with each of the two signal lines, along with a resistor R connecting the signal line with a DC voltage reference, $V_{TT\_N}$ or $V_{TT\_P}$. Normally, $V_{TT\_N}$ and $V_{TT\_P}$ are substantially equal and collectively known as $V_{TT}$; however, a small voltage offset between the two voltage references is possible. An important function of the voltage references is to allow the voltage at the inputs of the receiving comparator 10 to be maintained at a stable and acceptable level during times when the "p" and "n" lines are not being driven to a particular voltage level. More importantly, these voltage references define the midpoint voltage 210, thus also providing a reference for the other voltages levels identified in FIG. 2.

In order to detect the squelch state 204 of the differential signal pair, the electrical circuit 100 is configured to detect when the voltage of both the "p" and "n" lines are simultaneously above a predetermined level indicating the squelch state. The predetermined level may be referred to as the lower squelch threshold voltage 270 of FIG. 2, which resides at some voltage level between the minimum squelch voltage 230 and the maximum low data voltage 250. When both differential signal lines are above this level at the same time, data is not being transferred, and the squelch state is present. While FIG. 2 indicates that the lower squelch threshold voltage 270 is positioned essentially halfway between the minimum squelch voltage 230 and the maximum low data voltage 250, the positioning of the threshold is a matter of design choice, and may depend on a number of factors, such as noise sources and component voltage offsets.

More specifically, a first comparator 20 and a second comparator 30 are each driven at their positive inputs by the "p" and "n" lines, respectively. Also, the negative input of the first comparator 20 is driven by the analog output of a first digital-to-analog converter (DAC) 40, while, the negative input of the second comparator 30 is connected to the analog output of a second DAC 50. The DACs are employed to generate the lower squelch threshold voltage 270 against which both signal lines of the differential pair are to be compared in order to detect the squelch state. To generate the lower squelch threshold voltage 270, the DACs 40 and 50 are programmed with an appropriate digital value, possibly by way of a calibration process (described in greater detail below). Such programming may be accomplished by way of a microprocessor 70, application-specific integrated circuit (ASIC), or similar means. Alternately, the digital value may be predetermined.

The outputs of the first comparator 20 and the second comparator 30 drive the inputs of a logical AND gate 60. If both of these outputs attain a logic HIGH level, indicating that the voltages of both the "p" and "n" signal lines are above the lower squelch threshold voltage 270, the output of the AND gate becomes HIGH, indicating the presence of the squelch state on the differential signal pair. At all other times, when either or both signal lines exhibit a voltage lower than the lower squelch threshold voltage 270, the differential pair are not in the squelch state, and the output of the AND gate is LOW.

During extremely short time periods when the "p" and "n" signal lines are in transition between V+ and V− in the data transfer state 203, both signal lines may have voltages above the lower squelch threshold voltage 270, possible causing the output of the AND gate 60 (i.e., the squelch detect signal) to briefly indicate a squelch state. If any circuitry interpreting the squelch detect signal would be adversely affected by the presence of such short pulses, a small filtering capacitor $C_s$ may be employed to filter out those pulses, leaving only those indications of a true squelch condition.

Figure 4:
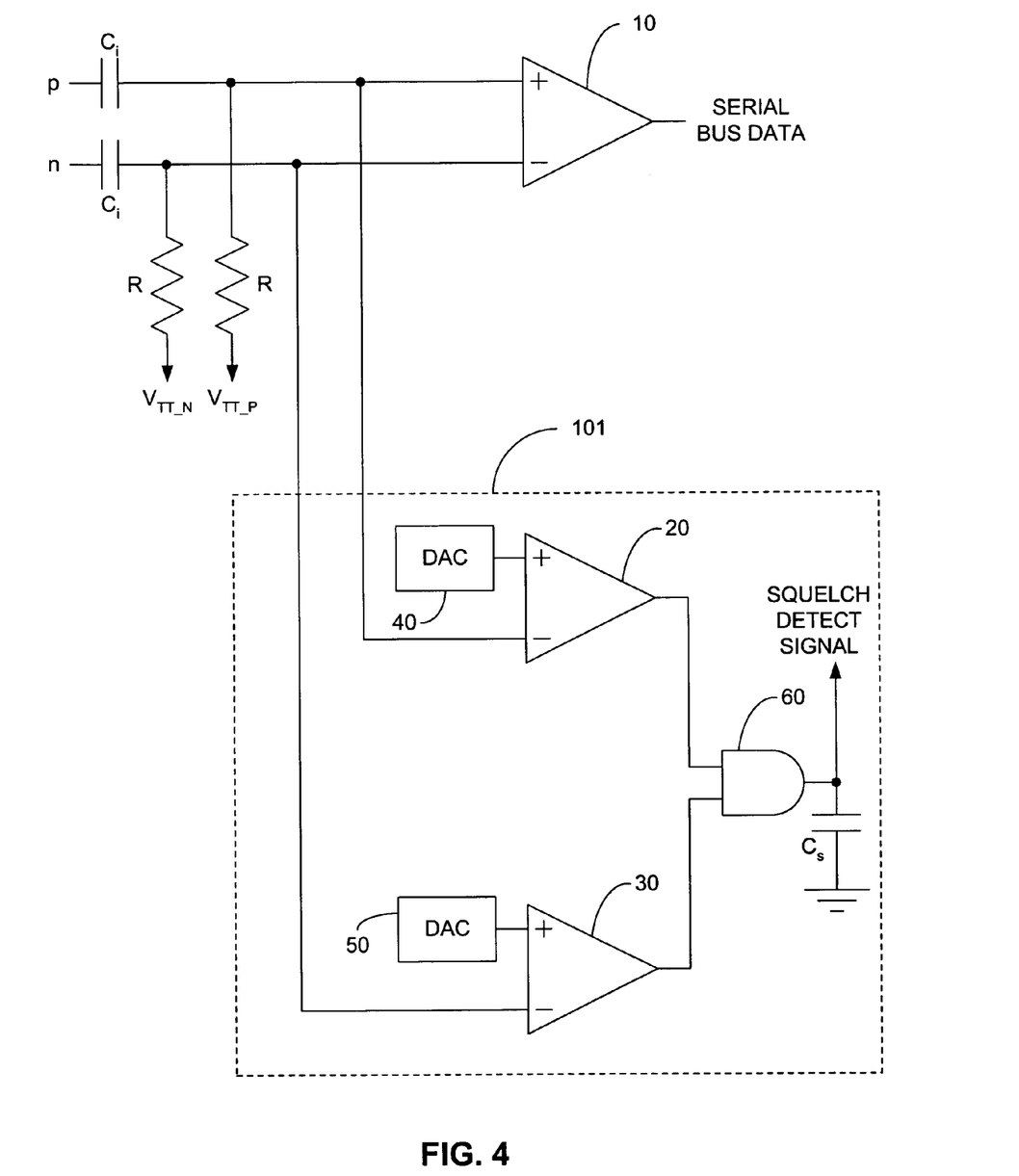
FIG. 4 is a schematic diagram of a second squelch detection circuit according to an embodiment of the invention.

An alternate embodiment of the invention, a second electrical circuit 101 shown in FIG. 4, may be used which employs an upper squelch threshold voltage 260 (of FIG. 2), which resides between the upper squelch voltage 220 and the minimum high data voltage 240. In this case, the analog outputs of the first DAC 40 and the second DAC 50 drive the positive inputs of the first comparator 20 and the second comparator 30, respectively. Each of the DACs 40 and 50 are programmed such that their analog outputs reside at approximately the upper squelch threshold voltage 260. The negative inputs of the first comparator 20 and the second comparator 30 are then driven at their negative inputs by the "p" and "n" differential signal lines, respectively. As before, the outputs of the comparators 20 and 30 then drive the inputs of the AND gate 60. Therefore, if both differential signal lines simultaneously reside below the upper squelch data threshold 260, the output of the AND gate 60 (i.e., the squelch detect signal) will become active.

Again, in similar fashion to the first electrical circuit 100, a small filtering capacitor $C_s$ optionally may be utilized to dampen out any small pulses that may occur while the "p" and "n" signal lines are transitioning between V+ and V− in the data transfer state 203.

Figure 5:
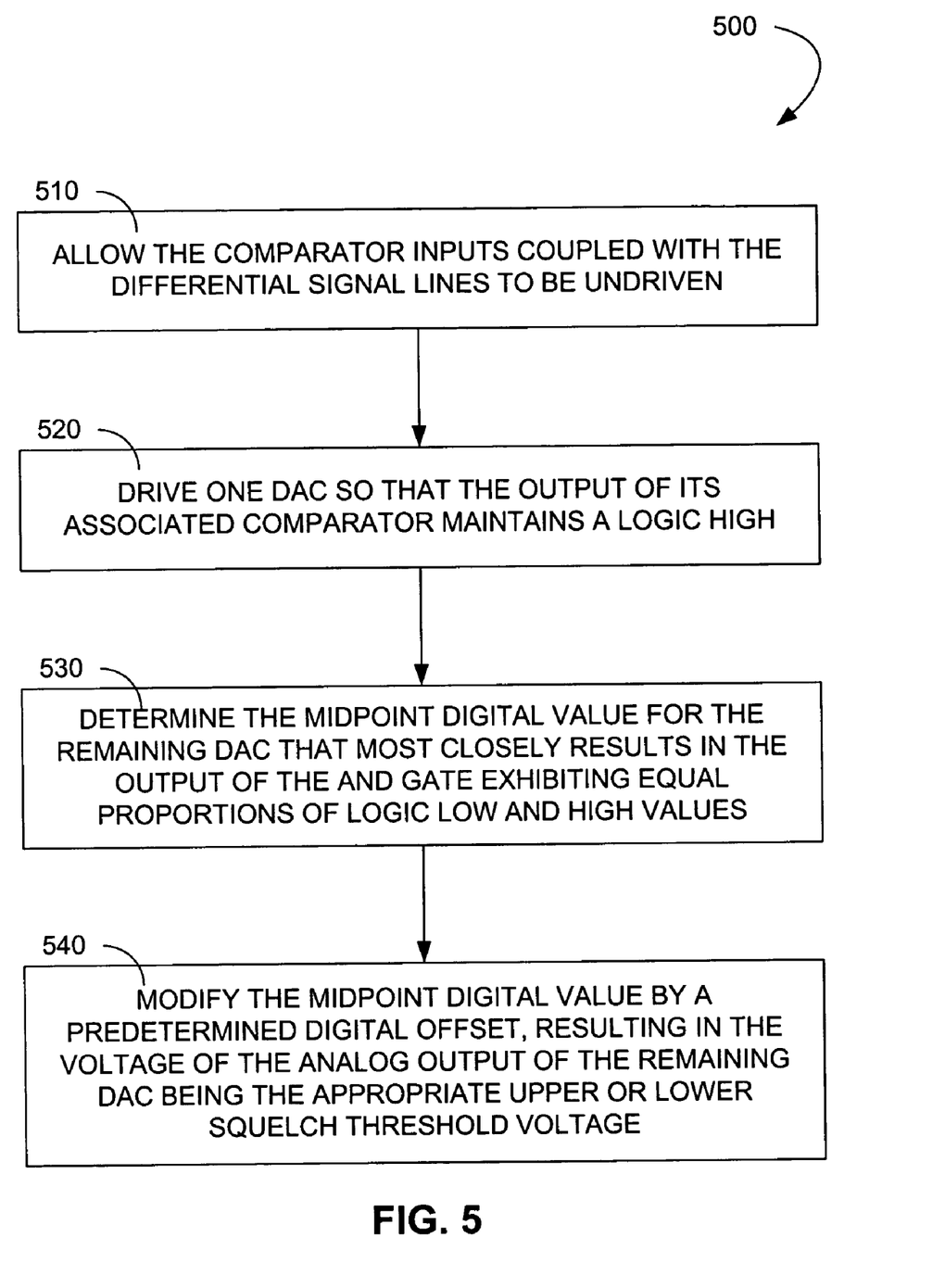
FIG. 5 is a flow diagram of a method for calibrating the digital-to-analog converters of a squelch detection circuit according to an embodiment of the invention.

In order to set the analog outputs of the DACs 40 and 50 correctly, a predetermined digital data value may be loaded into the DACs 40 and 50, or a more accurate calibration method 500 may be undertaken, as shown in FIG. 5. Initially, the inputs of the comparators 20 and 30 associated with the differential signal lines are allowed to remain undriven (step 510), such as by disconnecting the differential signal lines physically, or disabling all signal drivers on those two lines. In the case of the disclosed embodiments, this step will allow the "p" signal line to reside at $V_{TT\_P}$ volts and the "n" signal line to reside at $V_{TT\_N}$ volts.

Next, one of the DACs 40 and 50 would be driven so that the output of the comparator associated with that DAC will remain at a logical HIGH state (step 520). In the case of the first electrical circuit 100, this step can normally be performed by setting the digital input of that DAC to a level lower than $V_{TT\_P}$ (for DAC 40) or $V_{TT\_N}$ (for DAC 50). With respect to the second electrical circuit 101, the DAC would be driven to a level higher than $V_{TT\_P}$ (for DAC 40) or $V_{TT\_N}$ (for DAC 50).

Meanwhile, a midpoint digital value corresponding to the midpoint voltage 210, as shown in FIG. 2, is determined for the remaining DAC (step 530). Typically, this digital value may be determined by attempting various digital values while monitoring the output of the AND gate 60 to determine which value most closely produces an equal distribution of logic HIGHs and LOWs at that output. Other methods of determining the midpoint digital value may also be employed.

Once the midpoint digital value is ascertained, a predetermined digital offset may be used to modify the midpoint digital offset of the remaining DAC to produce the digital value associated with the upper or lower squelch threshold voltage (step 540). In the case of the first circuit 100, the predetermined digital offset would be subtracted from the midpoint digital value to produce the lower squelch threshold voltage 270 at the output of the DAC. Regarding the second circuit 101, the predetermined digital offset is added to the midpoint digital value so that the output of the remaining DAC produces an output voltage equal to the upper squelch threshold voltage 260.

Once this method has been performed for calibration of one of the DACs, the process is repeated for the opposite DAC to complete the calibration of the entire circuit.

Embodiments of the present invention exhibit several desirable qualities. For example, the loading of the differential signal pair by embodiments of the invention are symmetrical, thus not effecting the signal voltage or speed of the pair in unbalanced way. Also, the circuits disclosed allow independent control of the reference voltages produced by the two DACs 40 and 50, thus accounting for any errors induced by offset voltages inherent in the comparators 20 and 30, as well any voltage difference between $V_{TT\_N}$ and $V_{TT\_P}$. Additionally, the disclosed embodiments do not rely on comparator hysteresis or planned signal delay, thus providing enhanced dynamic response, even on small-voltage-swing differential signals.

The invention may also be embodied as a method of detecting the squelch state of a differential signal pair. The particular form of the method depends upon whether the upper squelch threshold voltage 260 (from FIG. 2) or the lower squelch threshold voltage 270 is employed as a reference.

Figure 6:
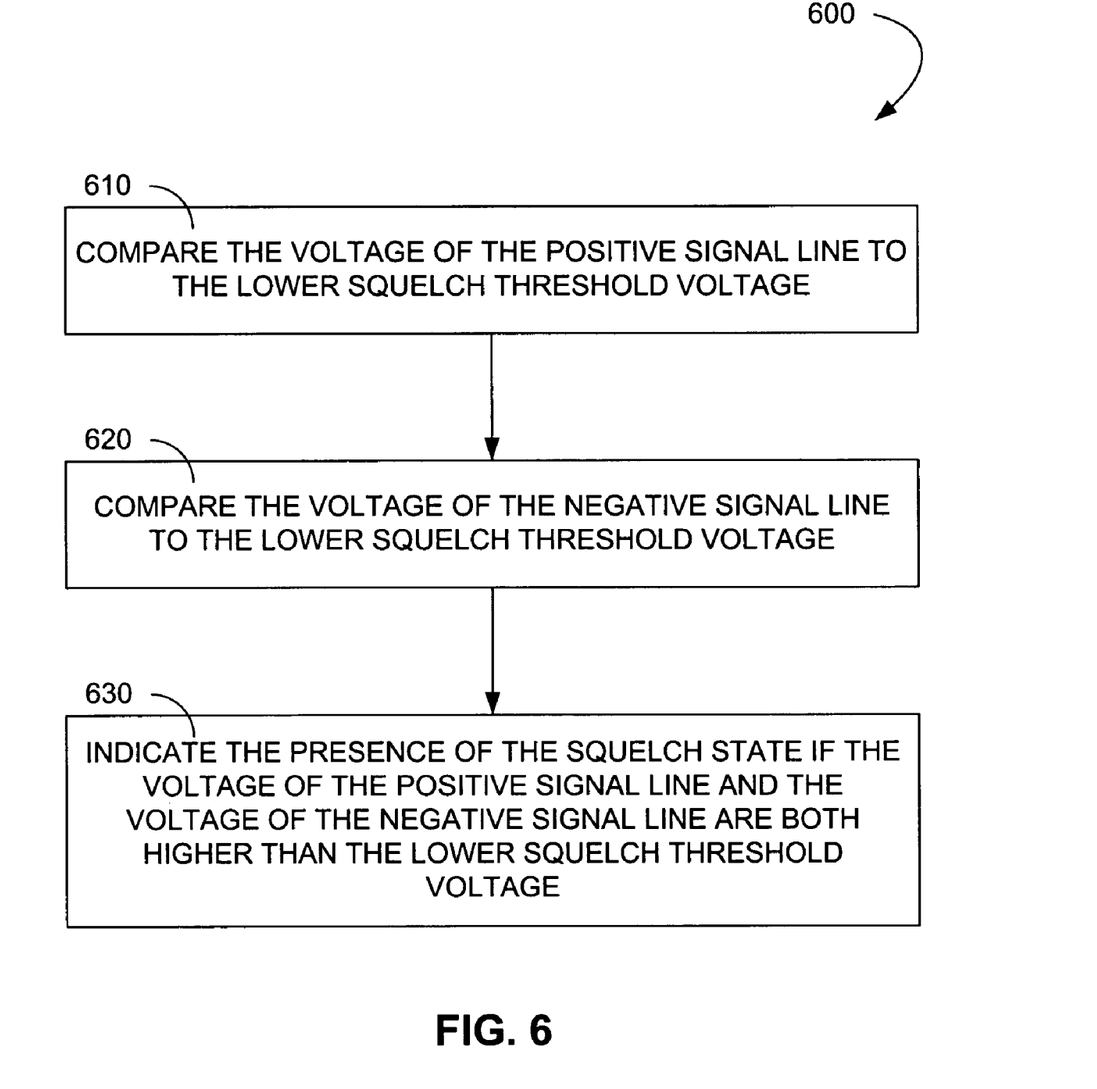
FIG. 6 is a flow diagram of a first method for detecting the squelch state of a differential signal pair according to an embodiment of the invention.

If the lower squelch threshold voltage 260 is used, a method 600 for detecting the squelch state, as shown in FIG. 6, involves comparing the voltage of both the "p" and "n" signal lines against the lower squelch threshold voltage (steps 610 and 620). If the voltages of both the "p" and "n" signal lines of the differential pair are higher than the lower squelch threshold voltage, then the presence of the squelch state is indicated (step 630).

Figure 7:
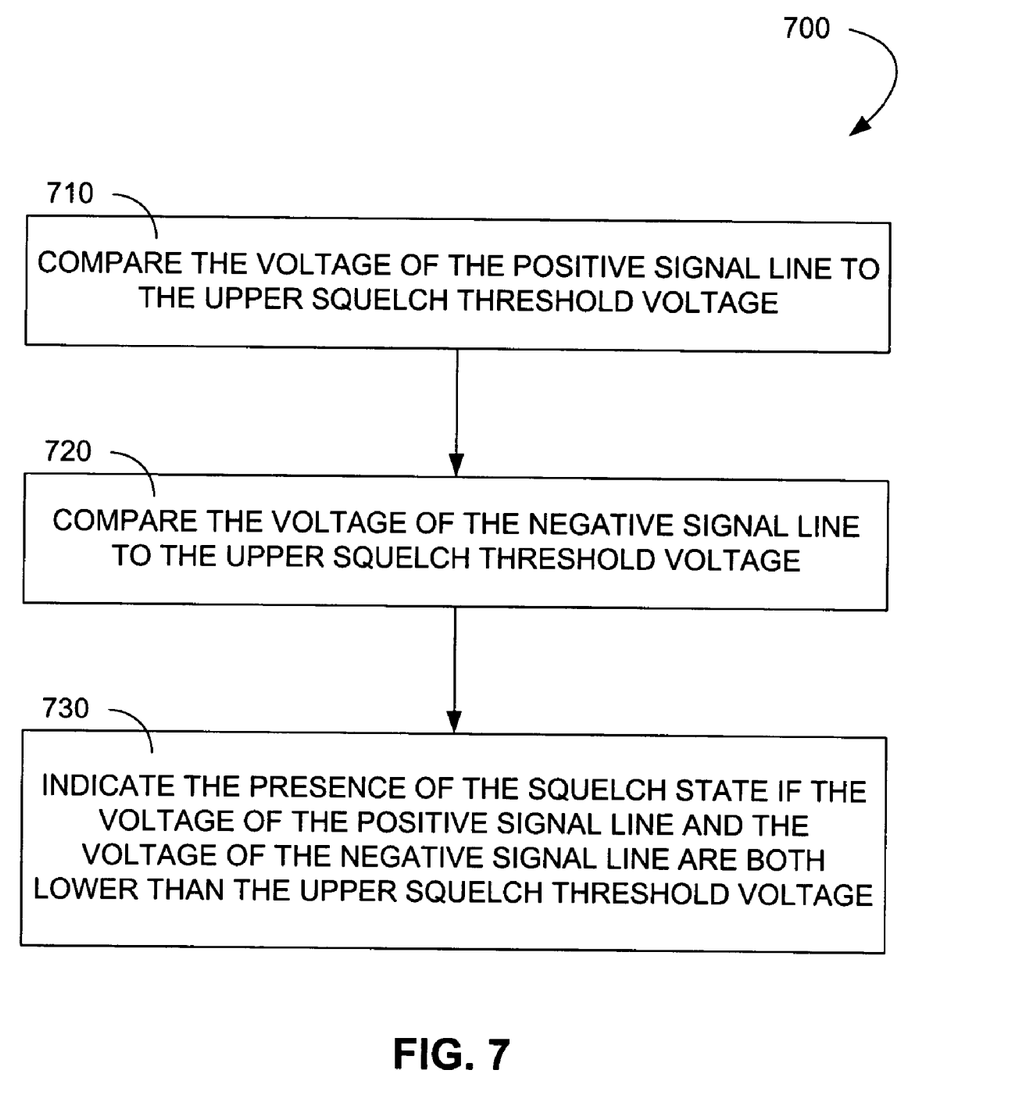
FIG. 7 is a flow diagram of a second method for detecting the squelch state of a differential signal pair according to an embodiment of the invention.

Likewise, if the upper squelch threshold voltage 270 is employed, a squelch detection method 700, as can be seen in FIG. 7, begins by comparing the voltage of the "p" and "n" signal lines against that upper squelch threshold voltage (steps 710 and 720). If the voltages of both differential signal lines are lower than the upper squelch threshold voltage, then the presence of the squelch state is indicated (step 730).

From the foregoing, embodiments of the invention provide a quick and reliable electrical circuit and method for detecting the squelch or out-of-band state of a differential signal pair. Embodiments of the invention other than those shown above are also possible. As a result, the invention is not to be limited to the specific forms so described and illustrated; the invention is limited only by the claim.

What is claimed is:

1. An electrical circuit for detecting a squelch state of a differential signal pair, the differential signal pair having a positive signal line and a negative signal line, the circuit comprising:
   a first digital-to-analog converter having an analog output;
   a second digital-to-analog converter having an analog output;
   a first comparator having a negative input, a positive input, and an output, the analog output of the first digital-to-analog converter driving the negative input of the first comparator, the positive signal line of the differential pair driving the positive input of the first comparator;
   a second comparator having a negative input, a positive input, and an output, the analog output of the second digital-to-analog converter driving the negative input of the second comparator, the negative signal line of the differential pair driving the positive input of the second comparator; and
   a logical AND gate having a first and second inputs and an output, the output of the first comparator driving the first input of the logical AND gate, the output of the second comparator driving the second input of the logical AND gate, the logical state of the output of the logical AND gate indicating the squelch state of the differential signal pair when the voltage of the analog outputs of the first and second digital-to-analog converters is a lower squelch threshold voltage.

2. The electrical circuit of claim 1, further comprising a capacitor coupled to the output of the logical AND gate.

3. The electrical circuit of claim 1, wherein the first and second digital-to-analog converters are driven by a microprocessor configured to calibrate the analog output of both the first and second digital-to-analog converters.

4. A method for calibrating the analog output of the first digital-to-analog converter of claim 3 to the lower squelch threshold voltage, comprising:
   allowing the positive inputs of the first comparator and the second comparator to be undriven;
   driving the second digital-to-analog converter so that the output of the second comparator maintains a logic HIGH;
   determining a midpoint digital value for the first digital-to-analog converter that most closely results in the output of the logical AND gate exhibiting equal proportions of logic LOW and logic HIGH values; and subtracting from the midpoint digital value a predetermined digital offset, resulting in the voltage of the analog output of the first digital-to-analog converter being the lower squelch threshold voltage.

5. A method for calibrating the analog output of the second digital-to-analog converter of claim 3 to the lower squelch threshold voltage, comprising:

allowing the positive inputs of the first comparator and the second comparator to be undriven;

driving the first digital-to-analog converter so that the output of the first comparator maintains a logic HIGH;

determining a midpoint digital value for the second digital-to-analog converter that most closely results in the output of the logical AND gate exhibiting equal proportions of logic LOW and logic HIGH values; and subtracting from the midpoint digital value a predetermined digital offset, resulting in the voltage of the analog output of the second digital-to-analog converter being the lower squelch threshold voltage.

6. An electrical circuit for detecting a squelch state of a differential signal pair, the differential signal pair having a positive signal line and a negative signal line, the circuit comprising:

a first digital-to-analog converter having an analog output;

a second digital-to-analog converter having an analog output;

a first comparator having a negative input, a positive input, and an output, the analog output of the first digital-to-analog converter driving the positive input of the first comparator, the positive signal line of the differential pair driving the negative input of the first comparator;

a second comparator having a negative input, a positive input, and an output, the analog output of the second digital-to-analog converter driving the positive input of the second comparator, the negative signal line of the differential pair driving the negative input of the second comparator; and a logical AND gate having a first and second inputs and an output, the output of the first comparator driving the first input of the logical AND gate, the output of the second comparator driving the second input of the logical AND gate, the logical state of the output of the logical AND gate indicating the squelch state of the differential signal pair when the voltage of the analog outputs of the first and second digital-to-analog converters is an upper squelch threshold voltage.

7. The electrical circuit of claim 6, further comprising a capacitor coupled to the output of the logical AND gate.

8. The electrical circuit of claim 6, wherein the first and second digital-to-analog converters are driven by a microprocessor configured to calibrate the analog output of both the first and second digital-to-analog converters.

9. A method for calibrating the analog output of the first digital-to-analog converter of claim 8 to the upper squelch threshold voltage, the method comprising:

allowing the negative inputs of the first comparator and the second comparator to be undriven;

driving the second digital-to-analog converter so that the output of the second comparator maintains a logic HIGH;

determining a midpoint digital value for the first digital-to-analog converter that most closely results in the output of the logical AND gate exhibiting equal proportions of logic LOW and logic HIGH values; and adding to the midpoint digital value a predetermined digital offset, resulting in the voltage of the analog output of the first digital-to-analog converter being the upper squelch threshold voltage.

10. A method for calibrating the analog output of the second digital-to-analog converter of claim 8 to the upper squelch threshold voltage, comprising:

allowing the negative inputs of the first comparator and the second comparator to be undriven;

driving the first digital-to-analog converter so that the output of the first comparator maintains a logic HIGH;

determining a midpoint digital value for the second digital-to-analog converter that most closely results in the output of the logical AND gate exhibiting equal proportions of logic LOW and logic HIGH values; and adding to the midpoint digital value a predetermined digital offset, resulting in the voltage of the analog output of the second digital-to-analog converter being the upper squelch threshold voltage.

11. A method for detecting a squelch state of a differential signal pair, the differential signal pair having a positive signal line and a negative signal line, the method comprising:

comparing the voltage of the positive signal line to a lower squelch threshold voltage;

comparing the voltage of the negative signal line to the lower squelch threshold voltage; and indicating the presence of the squelch state if the voltage of the positive signal line and the voltage of the negative signal line are both higher than the lower squelch threshold voltage.

12. A method for detecting a squelch state of a differential signal pair, the differential signal pair having a positive signal line and a negative signal line, the method comprising:

comparing the voltage of the positive signal line to an upper squelch threshold voltage;

comparing the voltage of the negative signal line to the upper squelch threshold voltage; and indicating the presence of the squelch state if the voltage of the positive signal line and the voltage of the negative signal line are both lower than the upper squelch threshold voltage.

* * * * *